United States Patent
Ahn

(10) Patent No.: US 6,918,570 B2
(45) Date of Patent: Jul. 19, 2005

(54) ANTI-LOCK BRAKE EQUIPMENT SOLENOID VALVE

(75) Inventor: Dong-Ho Ahn, Kyunggi-do (KR)

(73) Assignee: Hyundai Mobis, Co., Ltd., Kyunggi-do (KR)

( * ) Notice: Subject to any disclaimer, the term of this patent is extended or adjusted under 35 U.S.C. 154(b) by 83 days.

(21) Appl. No.: 10/322,734

(22) Filed: Dec. 19, 2002

(65) Prior Publication Data

US 2003/0201418 A1 Oct. 30, 2003

(30) Foreign Application Priority Data

Apr. 24, 2002 (KR) ................................ 10-2002-0022539

(51) Int. Cl.⁷ ............................ B60T 8/36; F16K 31/02
(52) U.S. Cl. .......................... 251/129.15; 251/129.02; 303/119.2
(58) Field of Search ................ 251/129.02, 129.15; 303/119.1, 119.2; 137/454.2

(56) References Cited

U.S. PATENT DOCUMENTS

| | | | | |
|---|---|---|---|---|
| 5,167,442 A | * | 12/1992 | Alaze et al. | 251/129.02 |
| 5,439,279 A | * | 8/1995 | Linkner et al. | 251/129.15 |
| 5,577,322 A | * | 11/1996 | Ohshita et al. | 251/129.15 |
| 5,605,386 A | * | 2/1997 | Ziegler et al. | 303/119.2 |
| 5,673,980 A | * | 10/1997 | Schwarz et al. | 303/119.2 |
| 5,681,097 A | * | 10/1997 | Tackett et al. | 251/129.15 |
| 5,879,060 A | * | 3/1999 | Megerle et al. | 303/119.2 |
| 6,065,734 A | * | 5/2000 | Tackett et al. | 251/129.02 |
| 6,113,066 A | * | 9/2000 | Hohl et al. | 251/129.15 |
| 6,189,985 B1 | * | 2/2001 | Fritsch et al. | 303/119.2 |
| 6,247,766 B1 | * | 6/2001 | Subramanian et al. | 303/119.2 |
| 6,439,265 B1 | * | 8/2002 | Gruschwitz et al. | 251/129.15 |
| 6,471,305 B1 | * | 10/2002 | Leventhal et al. | 303/119.2 |

* cited by examiner

Primary Examiner—Eric Keasel
(74) Attorney, Agent, or Firm—Greenblum & Bernstein, P.L.C.

(57) ABSTRACT

A hydraulic control valve for an Anti-lock Braking System (ABS) includes a modulator block having at least a housing, an inlet port, a receiving unit, and an outlet port. The housing is coupled to at least a plunger, an armature, and a coil body. The housing also has a coupling hole to receive a valve seat. Upon application of a current, a coil generates a magnetic field causing a plunger coupled with the armature to perform a reciprocating motion in which a projection of the plunger moves in contact with and separates from an aperture in the valve seat to adjust fluid flow. The hydraulic control valve also comprises fluid flow paths, provided in a space between the valve seat and the housing, which communicate with an outlet port. The hydraulic control valve accommodates at least a filter and a seal cup on the outer periphery of the valve seat.

4 Claims, 2 Drawing Sheets

ANTI-LOCK BRAKE EQUIPMENT SOLENOID VALVE

BACKGROUND OF THE INVENTION

1. Field of the Invention

The present invention relates to a hydraulic control valve for an Anti-lock Brake System (ABS), in particular, which includes a modulator block having inlet and outlet ports and a receiving unit on which a solenoid valve is mounted, in which an armature having a magnetic body is coupled to a housing and the receiving unit so that application of current to a coil generates a magnetic field causing a plunger coupled with the armature to perform a reciprocating motion closely contacting with and separating from a hole of the valve seat so as to adjust the flow of brake oil.

2. Description of the Related Art

In general, an anti-skid system of a vehicle mounted with an anti-lock brake system detects the number of rotation of wheels based upon a signal from a wheel speed sensor and presents the number in an output signal so that an actuator controls the hydraulic pressure of wheel cylinders in response to the signal from an ECU according to road conditions so as to prevent locking of the wheels.

That is, the hydraulic control valve is an apparatus for introducing brake oil into a modulator block from a master cylinder to adjust the quantity of brake oil while adjusting the speed of the vehicle. The hydraulic control valve will be described in reference to FIG. 1.

A solenoid valve is inserted into a modulator block 1. Application of current to a coil 2 generates a magnetic field so that an armature 4 coupled with a plunger 3 is absorbed to a lateral portion of a housing 5 and the plunger 3 is absorbed to a flow hole 7 of a valve seat 6 to shut/open a valve port thereby adjusting brake oil.

SUMMARY OF THE INVENTION

The conventional solenoid valve having the above construction in use for the vehicular brake system requires a bushing and an O-ring to couple a housing to a modulator block, in which the housing requires machining in the outer periphery. Therefore, the conventional solenoid valve has problems that many components are required for constituting an article. Also the article has a complicated construction together with a large volume. In order to solve the above problems, it has been provided a solenoid valve having an outlet flow path formed in the inner periphery of a housing to which a valve seat is coupled. However, this solenoid valve accompanies such problems that the housing is hardly worked in the inside and the manufacturing cost is raised.

The present invention has been made to solve the foregoing problems and it is therefore an object of the present invention to provide a hydraulic control valve of an anti-lock brake system, in which includes a seal cup and a filter are coupled to the outer periphery of a valve seat and a flow path is arranged in the outer periphery of the valve seat inserted into a housing so that the component number is reduced, an article has a simple construction, the manufacturing cost is reduced thereby raising the manufacturing effect, and brake oil smoothly flows reducing resistance so as to improve braking power.

According to an aspect of the invention to obtain the above objects, it is provided an ABS hydraulic control valve comprising: a modulator block; an inlet port arranged in the modulator block; a receiving unit arranged in the modulator block and communicating with the inlet port; an outlet port arranged in the modulator block and communicating with the receiving unit, a housing mounted on the receiving unit and having a coupling hole in a side thereof; an outlet hole arranged in the housing and communicating with the outlet port; an armature mounted on a side of the housing; a plunger coupled with the armature and having a projection at an end thereof; a valve seat arranged adjacent to the projection of the plunger and installed in the coupling hole of the housing; a chamber arranged within the valve seat; a hole connected to the chamber for adjusting flow rate; a compressive spring supported on a face of the hole and coupled to a side of the projection of the plunger; the projection being closely contacted/detached with/from the compressive spring; and a seal cup coupled to an outer periphery of the valve seat.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Figure 1:
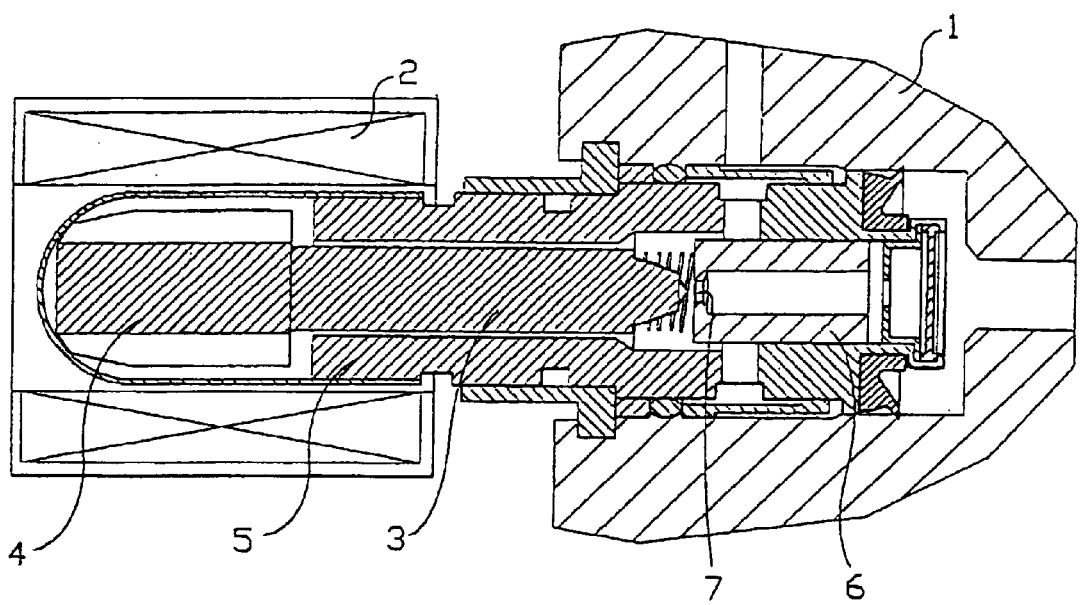
FIG. 1 is a sectional view of a conventional solenoid valve in use for a conventional brake system.
Figure 2:
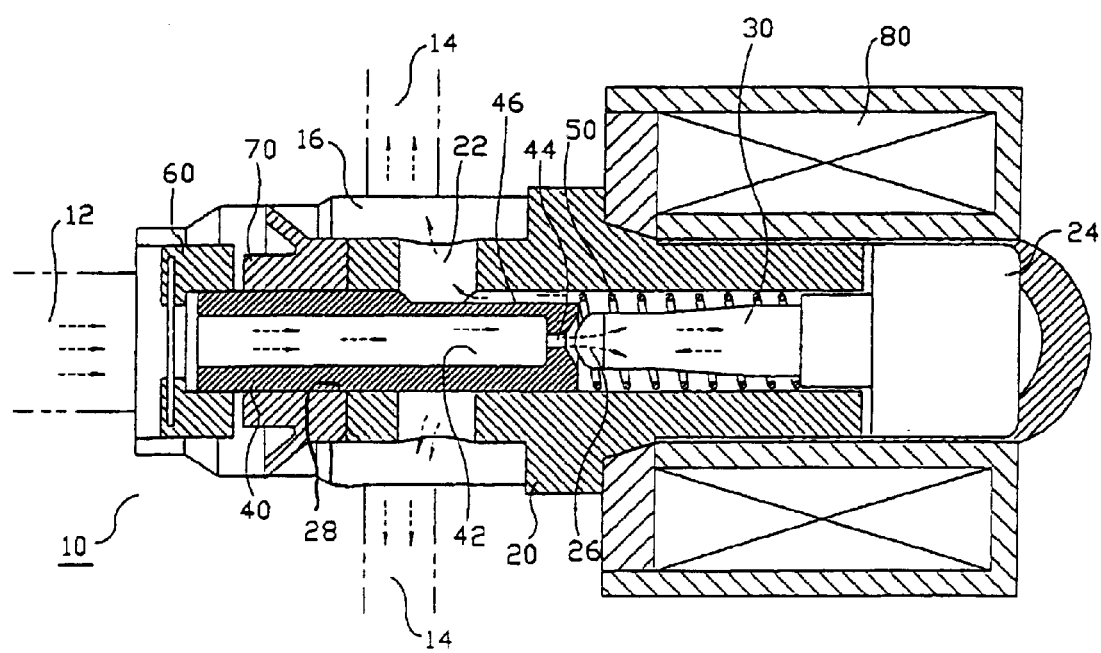
FIG. 2 is a sectional view of an ABS hydraulic control valve of the invention.

The following detailed description will present an ABS hydraulic control valve of the invention in reference to a side sectional view in FIG. 2.

First, a modulator block 10 has an inlet port 12 for inflow from a master cylinder and outlet ports 14 for outflow to wheel cylinders.

The modulator block 10 has a receiving unit 16 therein, which communicates with the inlet and outlet ports 12 and 14.

A housing 20 is mounted on the receiving unit 16, and has a coupling hole 28 perforated in an adequate portion of the housing 20.

The housing 20 has outlet holes 22 in the upper and lower ends thereof, which communicate with the outlet ports 14.

Further, the housing 20 also has an armature 24 mounted on a lateral portion thereof and a plunger 30 coupled to the armature 24 and received within the housing 20.

The plunger 30 has a projected terminal end or a projection 26, a valve seat 40 is installed in the coupling hole 28 of the housing 20 adjacent to the projection 26.

The valve seat 40 has a chamber 42 therein, which functions as a means for receiving oil introduced from the inlet port 12 and allowing oil to migrate through the same.

The valve seat 40 has a hole 44 at an end thereof opened/shut for connecting with the chamber 42.

The hole 44 serves to adjust the quantity of brake oil introduced into the chamber 42.

The projection 26 of the plunger 30 is supported on the face of the hole 44 and a compressive spring 50 is coupled to a portion of the projection 26 so that the projection 26 is attached/detached to/from the hole 44.

A seal cup 70 is coupled to the outer periphery of the valve seat 40 and formed in a lateral portion of the housing 20, and a filter 60 is coupled to the outer periphery of the valve seat 40 between the seal cup 70 and the inlet port 12.

The outer periphery of the valve seat 40 installed within the housing 20 is partially cut to form flow paths 46, which communicates with the outlet holes 22 of the housing 20.

Figure 3:
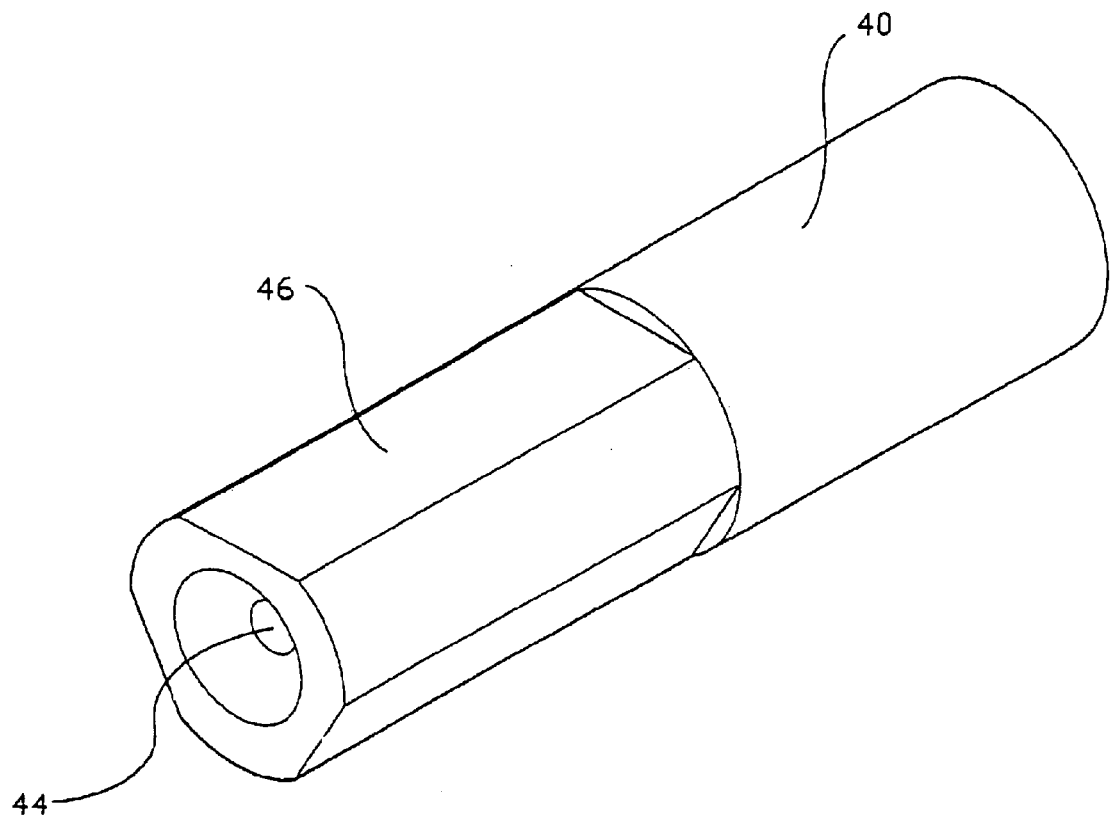
FIG. 3 is a perspective view of a valve seat of the invention.
Figure 4:
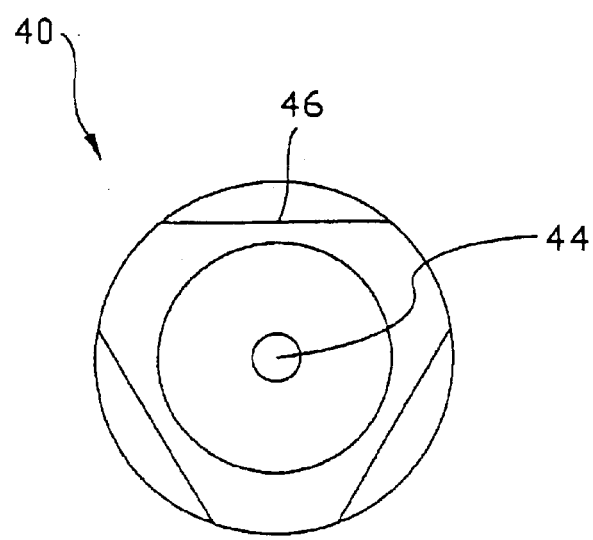
FIG. 4 is a front sectional view of the valve seat of the invention.

The flow paths 46 are shown more specifically in reference to a perspective view of the valve seat 40 in FIG. 3.

Although the present invention provides three flow paths, two or four flow paths can in equi-angle.

The hydraulic control valve of the invention having the above construction will be described as follows.

First, the projection 26 is constantly opened to the hole 44 of the valve seat 40 under the elastic force of the compressive spring 50 which is supported between a lateral face of the valve seat 40 and the projection 26 of the plunger 30.

Brake oil is introduced from the master cylinders into the inlet port 12, removed of foreign materials in the filter 60, and then introduced into the chamber 42 of the valve seat 40. Then brake oil passes through the hole 44 of the valve seat 40 to be discharged to the wheel cylinders via the outlet ports 14.

The seal cup 70 coupled to the outer periphery of the valve seat 40 functions to prevent brake oil from permeating into the outlet port 14 of the housing 20.

Further, a vehicular anti-lock brake system detects the rotation number of the wheel based upon a signal from a wheel speed sensor, and an actuator controls brake oil of the wheel cylinders according to road conditions in response to a signal from the ECU.

If it is judged to control so that oil flow would not occur between the inlet port 12 and the outlet port 14 in response to the signal from the ECU, the ECU applies current to a coil body 80.

Magnetic force transferred to the armature 24 causes the plunger 30 having the projection 26 at the end to move to seal the hole 44 of the valve seat 40.

This seals the flow path between the inlet port 12 and the outlet port 14 to cut the flow of brake oil.

When the ECU applies current to the coil body 80, the armature 24 closely contacts with the valve seat 40 sealing the same. When current is not applied, the armature 24 is detached owning to the elastic force of the compressive spring 50 so that oil introduced into the chamber 42 from the master cylinder moves from the hole 44 of the valve seat 40 via the flow paths 46 in the outer periphery to the outlet holes 22 of the housing 20. Then, brake oil flows out to the wheel cylinders via the outlet ports 14 communicating with the outlet holes 22 so as to adjust the quantity of brake oil.

According to the present invention as set forth above, the ABS hydraulic control valve has the following effects.

First, the valve seat is installed in the coupling hole of the housing to reduce the entire size of an article such as plunger and armature.

Second, the seal cup and the filter are coupled in the outer periphery of the valve seat so as to simplify assembly, decrease the number of components in the construction of an article and advantageously downsize and light-weight the hydraulic control valve as well as reduce the unit price of the article.

Third, the valve seat is cut in the outer periphery to readily form the wide flow path so that the fluid flow is smoothened without pneumatic resistance.

As set forth above, the ABS hydraulic control valve of the invention simplifies the assembly process and reduces manufacture cost thereby to produce an article which is more excellent than other articles.

What is claimed is:

1. An ABS hydraulic control valve comprising:

a modulator block;

an inlet port arranged in the modulator block;

a receiving unit arranged in the modulator block and communicating with the inlet port;

an outlet port arranged in the modulator block and communicating with the receiving unit;

a housing mounted on the receiving unit and having a coupling hole in a side thereof;

an outlet hole arranged in the housing and communicating with the outlet port;

an armature mounted on a side of the housing;

a plunger coupled with the armature and having a projection at an end thereof;

a valve seat arranged adjacent to the projection of the plunger and installed in the coupling hole of the housing;

a chamber arranged within the valve seat;

a hole connected to the chamber for adjusting flow rate;

a compressive spring supported on a face of the hole and coupled to a side of the projection of the plunger;

the projection being closely contacted/detached with/from the compressive spring; and a seal cup coupled to an outer periphery of the valve seat.

2. The ABS hydraulic control valve in accordance with claim 1, further comprising a filter arranged between the seal cup and the inlet port and coupled to the outer periphery of the valve seat.

3. The ABS hydraulic control valve in accordance with claim 1, further comprising a flow path by cutting the outer periphery of the valve seat within the housing, the flow path communicating with the outlet hole of the housing.

4. The ABS hydraulic control valve in accordance with claim 2, further comprising a flow path by cutting the outer periphery of the valve seat within the housing, the flow path communicating with the outlet hole of the housing.

* * * * *

UNITED STATES PATENT AND TRADEMARK OFFICE
CERTIFICATE OF CORRECTION

PATENT NO. : 6,918,570 B2  
DATED : July 19, 2005  
INVENTOR(S) : D. Ahn

Page 1 of 1

It is certified that error appears in the above-identified patent and that said Letters Patent is hereby corrected as shown below:

<u>Column 4,</u>  
Lines 20, 21, 23, 27, 33, 34, 37 and 46, delete "arranged".  
Line 26, "thereof" should be -- of the housing --.  
Line 32, "thereof" should be -- of the plunger --.  
Line 35, "installed" should be -- positioned --.  
Line 38, after "adjusting" insert -- a fluid --.  
Lines 39-40, "compressive spring supported on a face of the hole and coupled to a side of" should be -- compression spring coupled to --.  
Lines 41-42, "being closely contacted/detached with/from the compressive spring" should be -- configured to be contactable with and spaced from the hole --.  
Line 47, "port and" should be -- port, the filter being --.  
Lines 50 and 54, "by cutting" should be -- defined by a discrete surface of --.

Signed and Sealed this

Eleventh Day of April, 2006

JON W. DUDAS  
*Director of the United States Patent and Trademark Office*